Figure 1:
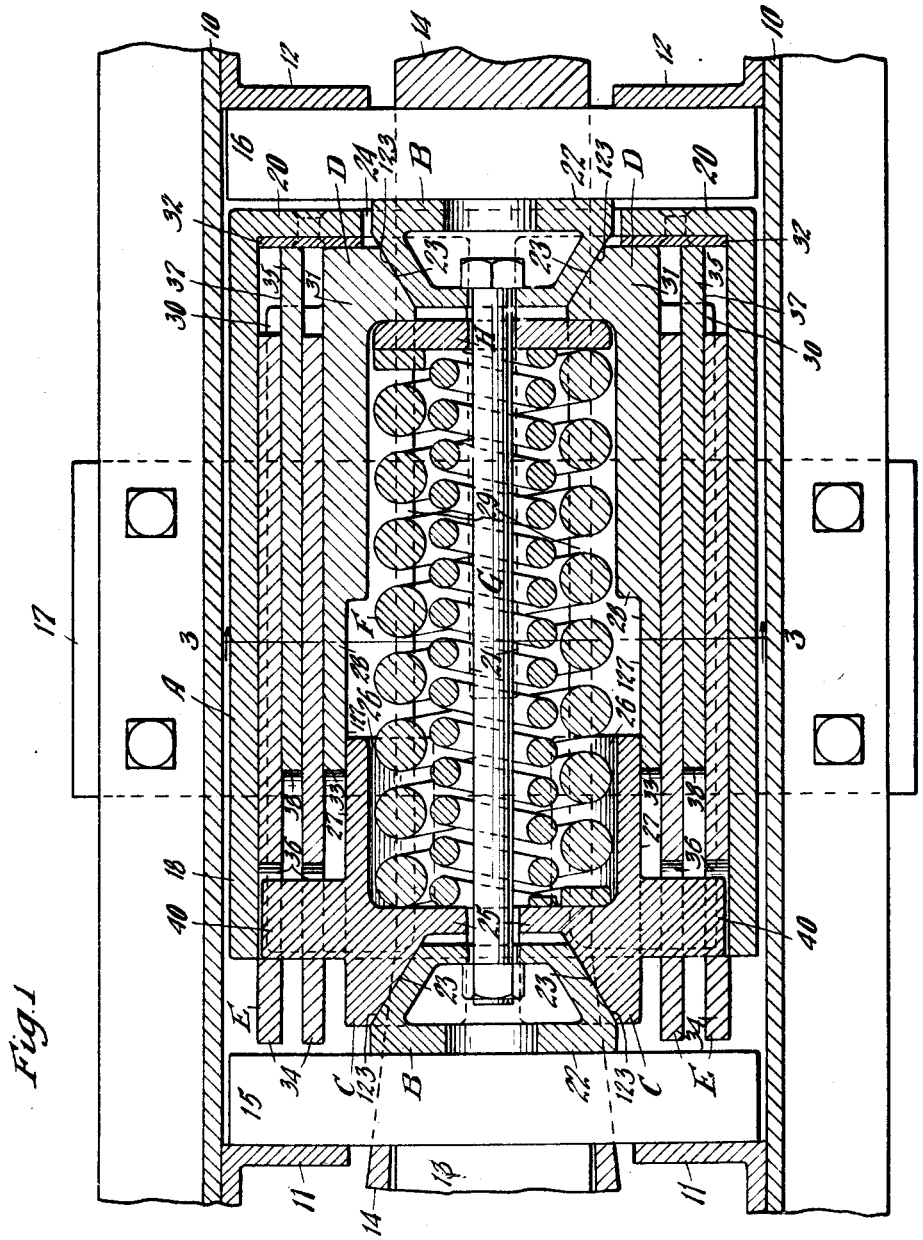

Nov. 10, 1925.
1,560,813
S. B. HASELTINE
FRICTION SHOCK ABSORBING MECHANISM
Filed May 28, 1924 2 Sheets-Sheet 1

Witnesses
Wm. Geiger

Inventor
Stacy B Haseltine
By George D Haight
His Atty

Nov. 10, 1925.
S. B. HASELTINE
1,560,813
FRICTION SHOCK ABSORBING MECHANISM
Filed May 28, 1924 2 Sheets-Sheet 2
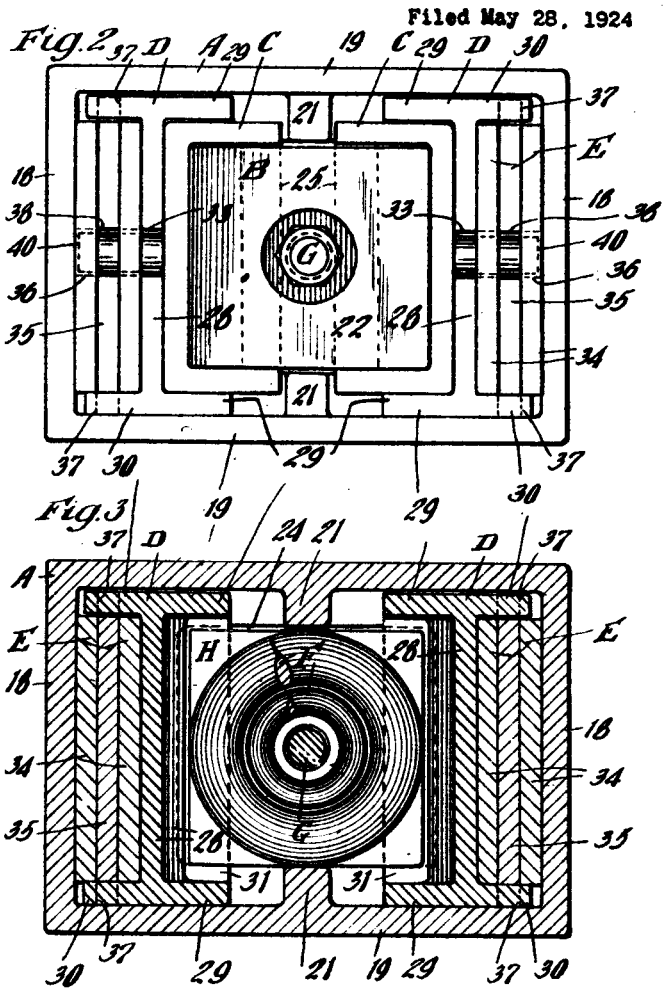
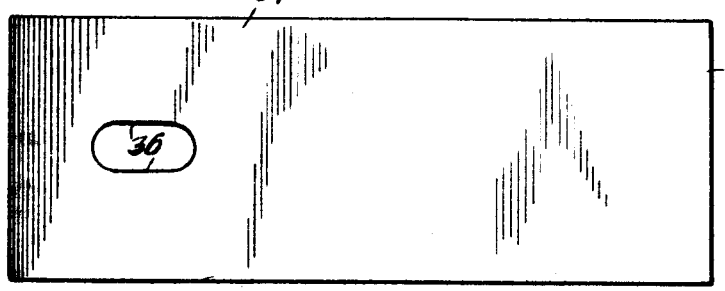
Witnesses
Wm. Geiger
Inventor
Stacy B. Haseltine
By George D. Haight
His Atty Patented Nov. 10, 1925.

1,560,813

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed May 28, 1924. Serial No. 716,313.

*To all whom it may concern:*

Be it known that I, STACY B. HASELTINE, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism of the intercalated plate type, especially adapted for railway draft riggings, having a preliminary relatively light action and a high capacity frictional resistance during the remainder of the compression stroke.

Another object of the invention is to provide a mechanism of the character indicated, comprising a plurality of relatively movable friction plates having means coacting therewith for placing the same under lateral pressure, including a plurality of relatively movable friction shoes having interengaging friction surfaces.

A further object of the invention is to provide a friction shock absorbing mechanism, including a plurality of relatively movable cooperating friction elements, and means for placing said elements under lateral pressure, wherein the friction elements are brought into operation in sequence to effect three progressively increasing stages of frictional resistance during the compression stroke.

A still further object of the invention is to provide a shock absorbing mechanism comprising a group of relatively movable friction elements and friction wedge means for placing said elements under lateral pressure including a pair of relatively movable friction shoes having interengaging friction surfaces, one of said pair of shoes having frictional engagment with the friction elements, wherein means is provided for initiating, in sequence, relative movement of said shoes, movement of said group of friction plates with reference to the shoes and relative movement of the plates of said group, and thereby progressively increasing the frictional resistance during a compression stroke.

A more specific object of the invention is to provide a shock absorbing mechanism including a friction shell, a plurality of relatively movable friction plates and a friction wedge system coacting with the plates, wherein the shoes have means thereon engaging the plates for restoring the latter to normal position, and certain of said shoes directly cooperate with the shell to restore the same to normal position also.

Other objects and advantages of the invention will more clearly appear from the description and claims hereinafter following.

In the drawings forming a part of this specification, Figure 1 is a longitudinal, horizontal, sectional view of a portion of a railway draft rigging, showing my improvements in connection therewith. Figure 2 is a front end, elevational view of the shock absorbing mechanism proper. Figure 3 is a vertical, transverse, sectional view of the shock absorbing mechanism proper, corresponding substantially to the line 3—3 of Figure 1. Figure 4 is a detail, side elevational view of one of the friction plates used in connection with my improved mechanism. And Figure 5 is a fragmentary, detail, side elevational view of the rear end portion of another friction plate of said mechanism.

In said drawings, 10—10 indicate channel shaped, center or draft sills of a railway car underframe, to the inner faces of which are secured front stop lugs 11—11 and rear stop lugs 12—12. The inner end portion of the drawbar is indicated at 13, the same being operatively connected to a yoke 14 of a well-known form, within which are disposed the shock absorbing mechanism proper and front and rear followers 15 and 16. The yoke and the parts therewithin are supported in operative position by a detachable saddle plate 17.

The improved shock absorbing mechanism proper, as shown, comprises, broadly, a friction shell or casing A; front and rear wedge blocks B—B; front and rear friction wedge shoes C—C and D—D; two groups of intercalated friction wedge plates E—E; a spring resistance F; a retainer bolt G; and a spring follower H.

The friction shell or casing A is in the form of a rectangular box-like casting open at the front end, and has spaced, longitudinally disposed side walls 18—18, longitudinally disposed, spaced top and bottom walls 19—19, and a vertical wall 20 at the rear end, the interior surfaces of the side walls 18 presenting longitudinally extending friction surfaces adapted to coact with the outermost plates of the groups E—E. As clearly shown in Figure 1, the shell A is of such a length that the front and rear ends thereof are normally spaced from the front and rear followers. Each of the walls 19 has on the interior side, a longitudinally disposed, relatively wide central rib 21 having its front end spaced inwardly from the corresponding end of the shell and merging at its rear end with the rear wall 20. The opposed top and bottom ribs 21 act to maintain the spring resistance element F in position, the bottom rib further acting as a support for the spring.

The front and rear wedge blocks B are of like construction, each block being in the form of a hollow casting and having a flat outer face 22 adapted to abut the inner surface of the corresponding main follower. Each block is also provided with a pair of faces 23 at the opposite sides thereof, converging inwardly of the mechanism and adapted to coact with the adjacent pairs of friction wedge shoes. The rear wedge B extends through a rectangular opening 24 provided in the end wall 20 of the shell A, the opening being of such a size that the wedge works freely therein.

The friction wedge shoes C—C, which are disposed at the front end of the mechanism, coact with the corresponding wedge block B. On the inner side, that is, the side nearest the longitudinal, central axis of the mechanism, each shoe C has a wedge face 123 correspondingly inclined to and adapted to coact with the corresponding wedge face 23 of the front block B. At the inner end of the wedge face 123, each block has a vertically disposed, laterally projecting flange 25 and inwardly of the flange the corresponding side of the body portion of the shoe is recessed as indicated at 26 to accommodate the adjacent side of the outer coil of the main spring resistance F. The outer side of each shoe C is flat, defining an elongated friction surface 27 adapted to coact with the corresponding shoe D of the rear pair. Adjacent the outer end, each of the shoes C is provided with a laterally outwardly projecting lug 40 for a purpose to be hereinafter described.

The pair of friction shoes D—D, which are also of like construction, are disposed at the rear end of the mechanism and coact with the rear wedge B. Each shoe D comprises an elongated body portion of generally I-shaped cross section substantially throughout its length, comprising a vertically disposed web 28 and longitudinally disposed top and bottom plates providing inner top and bottom flanges 29 and outer top and bottom flanges 30. At the rear end of each shoe D, the web 28 extends beyond the top and bottom flanges and is enlarged to provide a laterally projecting head 31 on the inner side of the shoe. The enlargement 31 is provided with a wedge face, similar to the wedge face 123 hereinbefore described, and also designated by 123, said wedge face cooperating with the corresponding wedge face 23 of the rear wedge B. The rear ends of the shoes D normally engage wear plates 32 riveted to the rear wall 20 and disposed at opposite sides of the shell. At the forward end, the inner surface of the web 28 of each shoe is cut away as clearly shown in Figure 1 to provide a longitudinally disposed, flat friction surface 127 adapted to cooperate with the outer friction surface 27 of the corresponding shoe C. At the forward end, the web 28 of each shoe D is provided with an inwardly extending, longitudinally disposed, central slot 33 adapted to loosely accommodate for sliding movement the lug 40 of the corresponding shoe C. The slot 33 of the shoe D is made of such a length as to permit full relative movement of the front and rear shoes during a compression stroke.

As herein shown, two groups of friction plates E are employed, one group being disposed on each side of the mechanism between the top and bottom flanges 30 of the corresponding shoe D. Each group is preferably composed of outer and inner plates 34 and an intermediate plate 35. The outer plate 34 of each group has frictional contact with the inner surface of the corresponding side wall 18 of the shell and the inner plate 34 of each group frictionally engages the outer flat surface of the web 28 of the adjacent rear wedge shoe D. The plates 34 are of similar construction and as best shown in Figure 4, each plate has adjacent the front end thereof a longitudinally elongated opening 36 disposed midway of its height and spaced inwardly from the front edge. The elongated openings 36 of the plates 34 of each group are adapted to slidingly receive the laterally projecting lug 40 of the corresponding front shoe C. The openings 36 are of such a length as to permit a certain amount of lost motion between the plates 34 and the shoes C to which they are connected by the lugs 40, the lugs 40 normally engaging the front walls of said openings, maintaining the outer ends of the plates 34 spaced inwardly from the front follower 15, projecting beyond the front end of the shell A. As will be evident, the lugs 40 serve to move the engaged plates outwardly during release of the mechanism to restore them to normal position.

The two plates 35 are also of like construction, and as shown in Figure 5, each plate has top and bottom lugs 37 at the rear end thereof forming abutments adapted to cooperate with the rear ends of the top and bottom flanges 30 of the corresponding shoe D. The lugs 37 of the plates 35 normally abut the flanges 30, the plates 35 being thus held in their outermost position with their rear ends in abutment with the respective wear plates 32. At the opposite or forward end, each plate 35 is provided with an inwardly extending slot 38 adapted to slidingly receive the lug 40 of the corresponding shoe C. The slots 38 of the plates 35 are of such a length as to permit full movement of the plates during a compression stroke of the mechanism.

The spring resistance F, which comprises an inner light and an outer relatively heavy coil, is interposed between the front and rear pairs of shoes C and D, bearing at its forward end on the flanges 25 of the shoes C and bearing at its rear end on the spring follower plate H, which in turn bears on the inner end faces of the projections 31 of the shoes D.

The parts of the shock absorbing mechanism are held in assembled relation and the mechanism maintained of proper overall length by the retainer bolt G extending through the inner coil of the spring resistance F and a central opening in the follower H, and having its front and rear ends anchored in the recesses of the hollow front and rear wedge blocks respectively. The bolt G also serves to hold the mechanism under initial compression.

As wear occurs on the various friction and wedge faces compensation therefor will be had by the expansion of the spring resistance F tending to force the wedge shoes C and D outwardly.

The operation of the mechanism is as follows, assuming an inward or buffing movement of the drawbar. Upon inward or rearward movement of the drawbar, the front follower 15 will be moved therewith, forcing the wedge B and the shoes C rearwardly, compressing the spring resistance element F and thereby forcing the rear pair of shoes D into taut wedging engagement with the rear wedge B, the latter being held stationary by engagement with the follower 16. At the same time, a wedging action will be set up between the front and rear wedges and wedge shoes, forcing the coacting friction surfaces 27 and 127 of the front and rear shoes into intimate contact and placing the friction plates under lateral pressure. As the rearward movement of the follower 15 continues, the front set of shoes will slide on the friction surfaces of the shoes D. During this action, the lugs 40 on the shoes will be moved away from the outer end walls of the openings 36 of the plates 34, and the front follower will approach the front ends of the plates 34. This action will continue until the front follower engages the plates 34, whereupon, the two groups of plates E and the shell A, due to the friction between the parts, will be moved rearwardly in unison with the front follower and front set of shoes, the groups of plates moving bodily rearwardly with reference to the rear shoes, the innermost plates 34 of each group sliding on the outer friction surfaces of the webs 28 of the respective shoes D. This movement continues until the shell A comes into abutment with the rear follower 16 whereupon the shell and plates 35, which have their rear ends abutting the end wall of the shell will be held stationary and the plates 34 will be moved rearwardly, further increasing and greatly augmenting the frictional resistance offered. During this rearward movement of the plates 35 and the shell A, the lugs 37 of the plates and end wall 20 of the shell will move away and be spaced from the rear ends of the shoes D and the flanges thereof respectively. The described movement of the follower 15, front pair of shoes C and plates 34 continues until the actuating force is removed or until the front end of the shell A is engaged by the front follower, whereupon the force is transmitted directly through the shell plates E and shoes D to the rear follower and stop lugs.

During draft, the action is the reverse of that just described, the front follower being held stationary and the rear follower being moved toward the same, thereby first moving the shoes D together with the two groups of friction plates and the shell A forwardly with reference to the shoes C, the friction plates and shell being carried with the shoes D due to the friction between the parts. This action continues until the front ends of the plates 34 engage the front follower 15 whereupon the shoes D will be slid relatively to the two groups of plates. Upon further movement of the follower 16, the shell A will be directly engaged, thereby causing the plates 35 to be moved forwardly, sliding on the plates 34 which are then in abutment with the front follower.

Upon reduction of the actuating force, the wedge pressure will be relieved and there will be an initial release of the friction shoes and wedges, independently of any relative movement of the plates. This initial release action is due to the lugs of the shoes C being spaced inwardly of the outer end walls of the slots of the plates 34 and the lugs 27 on the plates 35 being spaced from the rear ends of the flanges of the shoes D and the latter being spaced from the end wall of the shell A during the compression stroke of the mechanism. An easy and quick release and certain reduction of the lateral pressure on the groups of plates is thus assured. As the two pairs of shoes at the opposite ends of the mechanism are separated, due to the expansive action of the spring resistance, the lugs on the shoes C and the flanges of the shoes D will come into engagement with the outer end walls of the openings 30 of the plates 34, and the lugs 27 of the plates 35 respectively, carrying the plates outwardly therewith and restoring the same to normal position. The rear ends of the plates 35 and the corresponding ends of the shoes D will restore the shell to normal position also, by engagement with the rear wall of the latter.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with relatively movable front and rear followers; of a group of relatively movable, intercalated friction plates interposed between said followers, the corresponding ends of certain of said plates being normally spaced from one of said followers; a floating friction shell having a longitudinally disposed wall coacting with one side of said group of plates, said shell having one end normally slightly spaced from the other follower; front and rear friction wedge systems, disposed at the opposite side of said group of plates and coacting respectively with said followers, each system including a friction wedge shoe, said shoes having coacting friction surfaces; and a spring resistance interposed between said systems.

2. In a friction shock absorbing mechanism, the combination with front and rear follower members; of a plurality of longitudinally disposed, intercalated, friction plates interposed between said followers, said plates being divided into two separated groups, alternate plates of each group having their corresponding ends normally spaced from one of said followers; a shell enclosing said groups of plates for resisting lateral outward movement thereof and having an end wall with which certain of said plates normally engage, said shell being normally slightly spaced from the other follower; lateral pressure-creating means at each end of the mechanism, said means including front and rear friction wedge shoes cooperating with said two groups of plates, said front and rear shoes having coacting friction surfaces; and a spring resistance interposed between said front and rear shoes.

3. In a friction shock absorbing mechanism, the combination with front and rear follower members; of a plurality of longitudinally disposed, intercalated, friction plates interposed between said followers, said plates being divided into two separated groups, alternate plates of each group having their corresponding ends normally spaced from one of said followers; a shell enclosing said groups of plates for resisting lateral outward movement thereof and having an end wall with which certain of said plates normally engage, to restore the shell to normal position; duplicate, lateral pressure-creating means at each end of the mechanism, said duplicate means including front and rear friction wedge shoes cooperating with said two groups of plates, said front and rear shoes having coacting friction surfaces, said shoes and plates having coacting abutment means for restoring the latter to normal position; and a spring resistance interposed between said front and rear shoes.

4. In a friction shock absorbing mechanism, the combination with a floating friction shell; of a plurality of relatively movable, intercalated, friction plates within the shell, said plates being divided into two groups disposed at opposite sides of the mechanism in engagement with the respective side walls thereof; duplicate, front and rear, wedge pressure-creating means interposed between said two groups of plates, said front means including a pair of wedge shoes each having an outer longitudinally disposed friction face and said rear means including a pair of friction shoes each having an inner longitudinally disposed friction face coacting with the outer friction face of the corresponding shoe of the other pair; and a spring resistance interposed between said pairs of shoes.

5. In a friction shock absorbing mechanism, the combination with front and rear follower members; of a plurality of longitudinally disposed intercalated, friction plates interposed between said followers, said plates being divided into two separated groups, alternate plates of each group having their corresponding ends normally spaced from one of said followers; a shell enclosing said groups of plates for resisting lateral outward movement thereof and having an end wall; lateral pressure creating means at each end of the mechanism, said means at each end including front and rear sets of friction wedge shoes cooperating with said two groups of plates, said front and rear shoes having coacting friction surfaces, said shoes and plates having coacting abutment means for restoring the latter to normal position, one of said sets of shoes being adapted to engage the end wall of the shell to restore the latter to normal position; and a spring resistance interposed between said front and rear sets of shoes.

In witness that I claim the foregoing I have hereunto subscribed my name this 15th day of May 1924.

STACY B. HASELTINE.